United States Patent
Lee (10) Patent No.: US 9,802,445 B1
(45) Date of Patent: Oct. 31, 2017

(54) APPARATUS FOR NOISE REDUCTION OF TIRE OF VEHICLE

(71) Applicant: Hyundai Motor Company, Seoul (KR)

(72) Inventor: Chul Woo Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/257,705

(22) Filed: Sep. 6, 2016

(30) Foreign Application Priority Data

Apr. 18, 2016 (KR) .................. 10-2016-0047045

(51) Int. Cl.
*G10K 11/16* (2006.01)
*B60C 19/00* (2006.01)
*B60B 21/12* (2006.01)

(52) U.S. Cl.
CPC .......... *B60C 19/002* (2013.01); *B60B 21/12* (2013.01); *G10K 11/161* (2013.01); *B60B 2900/133* (2013.01)

(58) Field of Classification Search
CPC .... G10K 11/16; G10K 11/161; B60C 19/002; B60B 21/12; B60B 2900/002
USPC ........................................................ 181/211
See application file for complete search history.

(56) References Cited

U.S. PATENT DOCUMENTS

| | | | | |
|---|---|---|---|---|
| 4,355,578 A * | 10/1982 | Raquet | ................ | B60B 17/0017 104/306 |
| 5,891,278 A * | 4/1999 | Rivin | ...................... | B60B 21/12 152/400 |
| 2004/0250935 A1 * | 12/2004 | Morinaga | ................ | B60B 3/02 152/381.5 |
| 2005/0211358 A1 * | 9/2005 | Tanno | ................... | B60C 19/002 152/450 |
| 2010/0090520 A1 * | 4/2010 | Kamiyama | ............... | B60B 1/08 301/95.104 |
| 2015/0047920 A1 * | 2/2015 | Zhu | ........................ | B60C 19/002 181/211 |
| 2015/0048669 A1 * | 2/2015 | Zhu | ........................ | B60B 21/00 301/95.104 |
| 2016/0001596 A1 * | 1/2016 | Kamiyama | ............. | B60B 21/02 301/95.104 |
| 2016/0016430 A1 * | 1/2016 | Kamiyama | ........... | B60C 19/002 301/95.104 |
| 2016/0059624 A1 * | 3/2016 | Mohan | .................... | B60B 25/22 301/95.11 |

(Continued)

FOREIGN PATENT DOCUMENTS

| | | | | |
|---|---|---|---|---|
| FR | WO 0123195 A1 * | 4/2001 | .............. | B60C 3/06 |
| JP | 2004-330862 A | 11/2004 | | |
| JP | 2007-216914 A | 8/2007 | | |

(Continued)

*Primary Examiner* — Forrest M Phillips
(74) *Attorney, Agent, or Firm* — Mintz Levin Cohn Ferris Glovsky and Popeo, P.C.; Peter F. Corless (57) ABSTRACT

An apparatus for noise reduction of a tire reduces noise within a particular frequency range generated in the tire during operation of a vehicle. The apparatus includes a housing mounted on a wheel rim, the tire being fitted over the wheel rim, and the housing having an inner space; a resonant cover provided in the inner space of the housing; and a resonance hole formed in the resonant cover to allow the inner space of the housing and an inside of the tire to communicate with each other so that the resonant cover controls pulsation via air entering and exiting through the resonance hole.

12 Claims, 6 Drawing Sheets

(56) References Cited

U.S. PATENT DOCUMENTS

2016/0082769 A1* 3/2016 Ishii ................ B60B 21/026
  301/63.101

FOREIGN PATENT DOCUMENTS

| JP | 2008-183932 A | 8/2008 |
| JP | 2014-084039 A | 5/2014 |
| KR | 10-1993-0019434 | 10/1993 |
| KR | 2000-0033233 A | 6/2000 |

* cited by examiner

APPARATUS FOR NOISE REDUCTION OF TIRE OF VEHICLE

CROSS REFERENCE TO RELATED APPLICATION

The present application claims under 35 U.S.C. §119(a) the benefit of Korean Patent Application No. 10-2016-0047045, filed Apr. 18, 2016, the entire contents of which are incorporated by reference herein.

BACKGROUND (a) Technical Field

The present invention relates to an apparatus for noise reduction of a tire of a vehicle, in particular, an apparatus that reduces noise within a particular frequency range generated in the tire during operation of the vehicle.

(b) Description of the Related Art

Generally, noise is produced in a tire of a vehicle due to road noise and the generation of vibration due to the tire itself. Accordingly, to reduce resonant noise of a tire in the related art, a sound absorbing material for noise reduction is mounted in the tire, the shape of a wheel rim is changed, or a sound absorbing material is attached on a surface of a wheel rim.

However, when the sound absorbing material is mounted or attached on an inner surface of the tire, stress is concentrated on the inner surface by deformation of a tire tread during operation of the vehicle, and thus the sound absorbing material may be detached. Further, when the shape of the wheel rim is changed, additional deformation of the wheel rim may be caused by the stress applied to the tire.

Accordingly, to solve the problem of tire noise in the related art, the tire structure requires a drastic change, whereas if the tire structure is not greatly changed, it is difficult to realize a desired effect, and there is a limitation in solving the noise problem occurring in a tire within a particular frequency range.

The foregoing is intended merely to aid in the understanding of the background of the present invention, and is not intended to mean that the present invention falls within the purview of the related art that is already known to those skilled in the art.

SUMMARY

The present invention provides an apparatus for noise reduction of a tire, in which the apparatus reduces noise within a particular frequency range generated in the tire during operation of a vehicle, and in particular, as the apparatus enables tuning of resonance frequency, the apparatus optimizes the performance of the noise reduction according to a specification of the tire.

In order to achieve the above object, according to one aspect of the present invention, there is provided an apparatus for noise reduction of a tire, the apparatus including: a housing mounted on an outer circumferential surface of a wheel rim, the tire being fitted over the wheel rim, and the housing having an inner space and formed so as to be open at an upper part of the housing; a resonant cover provided in the inner space of the housing and configured to close the upper part of the housing; and a resonance hole formed in the resonant cover to allow the inner space of the housing and an inside of the tire to communicate with each other so that the resonant cover controls pulsation via air entering and exiting through the resonance hole.

The wheel rim may be provided with at least one mount part on the outer circumferential surface of the wheel rim, and the housing may be arranged on the mount part, the housing including an engagement part formed beneath a lower end of the housing with which the mount part is engaged.

The mount part of the wheel rim may be formed into a male screw or a female screw, and the engagement part of the housing may be formed into a female screw or a male screw corresponding to the mount part.

The housing may have guide threads formed on an inner circumferential surface of the housing, and the resonant cover may have corresponding threads formed on an outer circumferential surface of the resonant cover so as to correspond to the guide threads.

The resonant cover may include: a lower plate formed in a shape of a plate so as to close the inner space of the housing; an upper plate combined with the lower plate and arranged by being spaced apart upward from the lower plate at a predetermined distance, the upper plate having a through hole formed through a center of the upper plate; and a height adjustment device including: a bolt unit rotatably combined with the lower plate and exposed outside an upper surface of the upper plate through the through hole of the upper plate; and a slider part provided to be movable toward the bolt unit from the through hole of the upper plate, so that the height adjustment device allows the upper plate and the lower plate to rotate together during rotation of the bolt unit while the slider part comes into contact with the bolt unit.

The bolt unit of the height adjustment device may include: a body part being rotatably and vertically provided on a center of the lower plate; a head part formed polygonally on an upper end of the body part; and a position-holding part slidably fitted over the body part to move along the body part upward and downward, with a depressed coupling seat formed on an upper end of the position-holding part to surround the head part.

The position-holding part may have a slit formed on a periphery of the position-holding part, wherein the slit may be formed to have a polygonal surface along the periphery such that the upper plate and the lower plate rotate with the bolt unit when the slider part is inserted into the slit of the position-holding part.

The position-holding part may be elastically supported by an elastic spring on the lower plate.

The upper plate may be provided with a guide hole formed therethrough by extending from a center of the through hole in a diametrical direction, and the slider part may be provided in the guide hole and slides along the guide hole toward the center of the through hole.

The slider part may be provided with a grip part formed on an upper end of the slider part by protruding upward.

The apparatus may further include: a spiral spring provided between the lower plate and the upper plate, the spiral spring being formed of an elastic cord that is wound forming continuous orbits, wherein the elastic cord is connected to the bolt unit, and thus diameters of spiral spring orbits increase or decrease during the rotation of the bolt unit.

The elastic cord forming the spiral spring may be connected to the bolt unit at a first end of the elastic cord, unwound so as to gradually increase the diameters of the spiral spring orbits, bent outward from an inner orbit adjacent to an outermost orbit in a diametrical direction, and rewound to form the outermost orbit, such that a second end of the elastic cord is positioned at a starting point of the outermost orbit, whereby the spiral spring is placed inside the housing such that an outermost side of the elastic cord comes into close contact with the inner circumferential surface of the housing.

The spiral spring may be wrapped with a sealing rubber on a surface of the spiral spring.

Each of the upper plate and the lower plate may include the resonance hole formed therethrough, and the inner space and the inside of the tire may communicate with each other.

The apparatus for noise reduction of the tire having the above-mentioned configuration reduces noise within a particular frequency range generated in the tire during operation of the vehicle, and particularly, as the apparatus enables tuning of resonance frequency, the apparatus optimizes the performance of the noise reduction according to a specification of the tire.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinbelow, an apparatus for noise reduction of a tire according to an exemplary embodiment of the present invention will be described in detail with reference to the accompanying drawings.

Figure 1:
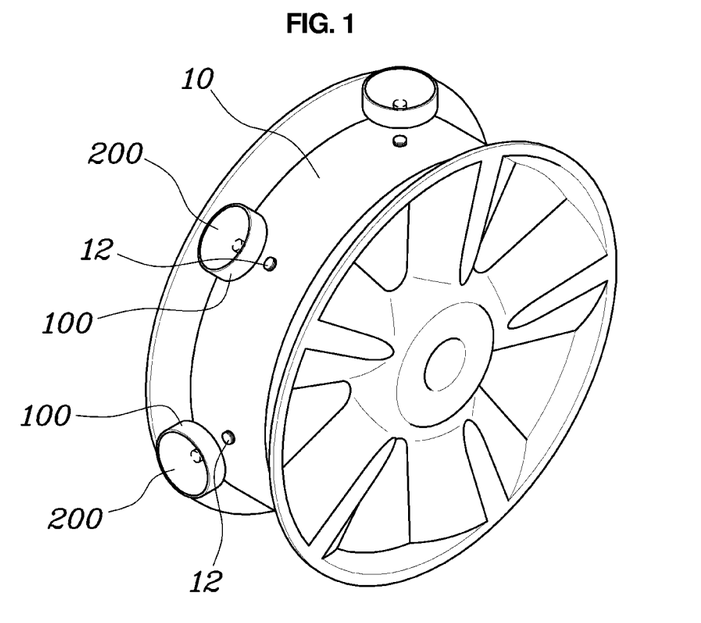
FIG. 1 is a perspective view showing the location of an apparatus for noise reduction of a tire, which is mounted on a wheel rim, according to an embodiment of the present invention.
Figure 2:
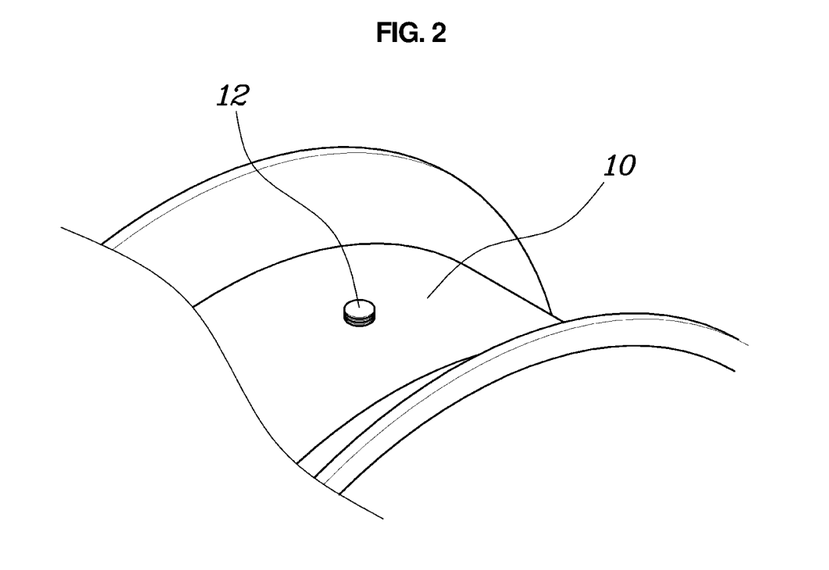
FIG. 2 is an enlarged view showing the wheel rim equipped with the apparatus for noise reduction of a tire shown in FIG. 1.
Figure 3:
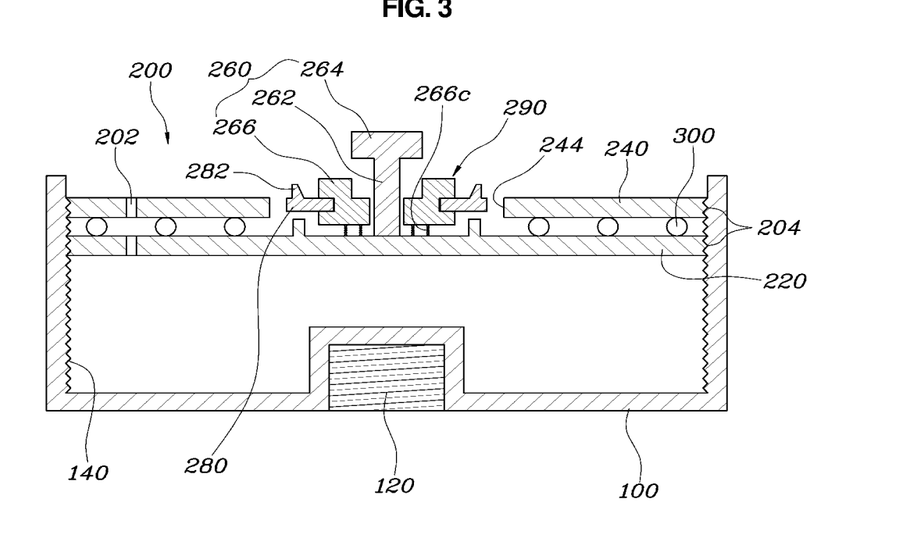
FIG. 3 is a sectional view of a housing constituting the apparatus for noise reduction of a tire shown in FIG. 1.

FIG. 1 is a perspective view showing the location of an apparatus for noise reduction of a tire, which is mounted on a wheel rim, according to an embodiment of the present invention; FIG. 2 is an enlarged view showing the wheel rim equipped with the apparatus for noise reduction of a tire shown in FIG. 1; FIG. 3 is a sectional view of a housing constituting the apparatus for noise reduction of a tire shown in FIG. 1; and FIGS. 4 to 11 are views illustrating the configuration of the apparatus for noise reduction of a tire shown in FIG. 1.

As shown in FIGS. 1 to 3, the apparatus for noise reduction of a tire according to the present invention includes: the housing 100 mounted on an outer circumferential surface of the wheel rim 10, with the tire being fitted over the wheel rim, the housing having an inner space and formed so as to be open at an upper part thereof; a resonant cover 200 provided in the inner space of the housing 100 and configured to close the upper part of the housing; and a resonance hole 202 formed in the resonant cover 200 to allow the inner space of the housing 100 and an inside of the tire to communicate with each other so that the resonant cover controls pulsation via air entering and exiting through the resonance hole 202.

According to the present invention, a resonance apparatus for noise reduction includes the housing 100 and the resonant cover 200 on the wheel rim 10 in the tire. In particular, the housing 100 has the inner space, and is formed to be open at the upper part thereof, and the resonant cover 200 is provided at an upper part of the inner space so as to close the opened part. The housing 100 includes the inner space having a predetermined volume, and particularly, the resonant cover 200 includes the resonance hole 202 formed therein, such that the inner space of the housing 100 and the inside of the tire communicate with each other. As air in the inner space of the housing 100 and air in the inside of the tire enter and exit through the resonance hole 202, sound absorption is realized, in accordance with the principle of a Helmholtz resonator, and resonance frequency is determined by a volume of the inner space of the housing 100.

The apparatus for noise reduction of a tire according to the present invention allows the volume in the inner space to be changed as the resonant cover 200 moves upward and downward in the inner space of the housing 100, thereby enabling tuning of resonance frequency and realizing noise reduction by resonance frequency optimized for various vehicles. Detailed description will be made hereinbelow concerning the above-mentioned noise reduction arrangement.

In particular, as shown in FIGS. 1 to 4, the wheel rim 10 may be provided with at least one mount part 12 on the outer circumferential surface thereof, and the housing 100 may be arranged on the mount part 12, the housing including an engagement part 120 formed beneath a lower end thereof with which the mount part 12 is engaged. The mount part 12 of the wheel rim 10 may be formed into a male screw or a female screw, and the engagement part 120 of the housing 100 may be formed into a female screw or a male screw corresponding to the mount part 12.

Figure 4:
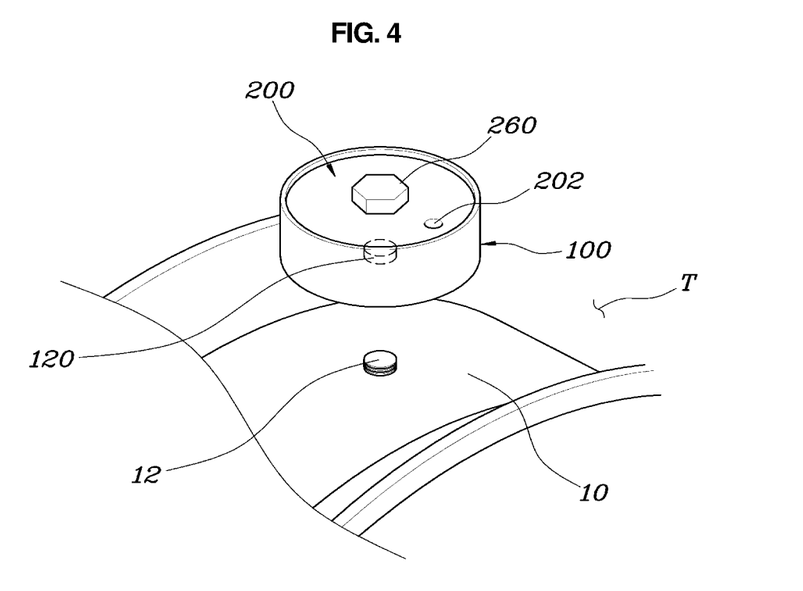
FIGS. 4 to 11 are views illustrating the configuration of the apparatus for noise reduction of a tire shown in FIG. 1.

Accordingly, as the wheel rim 10 is provided with at least one mount part 12 thereon, the housing 100 and the resonant cover 200 may also include multiple housings and resonant covers depending on the number of the mount part 12, and may be designed according to resonance frequency optimized for noise reduction. The housing 100 is engaged with the mount part 12 of the wheel rim 10, and the mount part 12 may be formed into the male screw protruding from the wheel rim 10, and the engagement part 120 of the housing 100 may be depressed and formed into the female screw corresponding to the mount part 12 formed into the male screw such that the housing 100 is combined with the wheel rim 10. Of course, the mount part 12 of the wheel rim 10 may be formed into the female screw that is depressed, and the engagement part 120 of the housing 100 may be formed into the male screw that protrudes such that the mount part and the engagement part are screwed to each other.

According to the present invention, to change the volume of the inner space of the housing 100, the resonant cover 200 is configured to move in the inner space of the housing 100.

Figure 5:
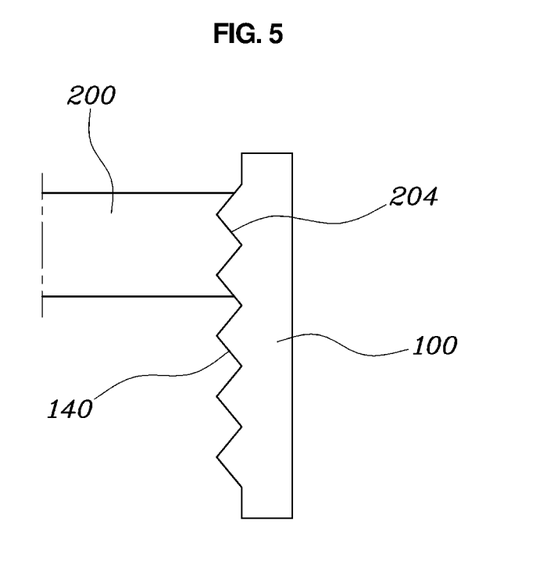

As shown in FIG. 5, the housing 100 has guide threads 140 formed on an inner circumferential surface thereof, and the resonant cover 200 has corresponding threads 204 formed on an outer circumferential surface thereof, the corresponding threads corresponding to the guide threads, and thus the inner circumferential surface of the housing 100 and the outer circumferential surface of the resonant cover 200 are screwed to each other. The resonant cover 200 moves upward and downward in the inner space of the housing 100 during rotation of the resonant cover 200 while the corresponding threads 204 move in contact with the guide threads 140.

Figure 6:
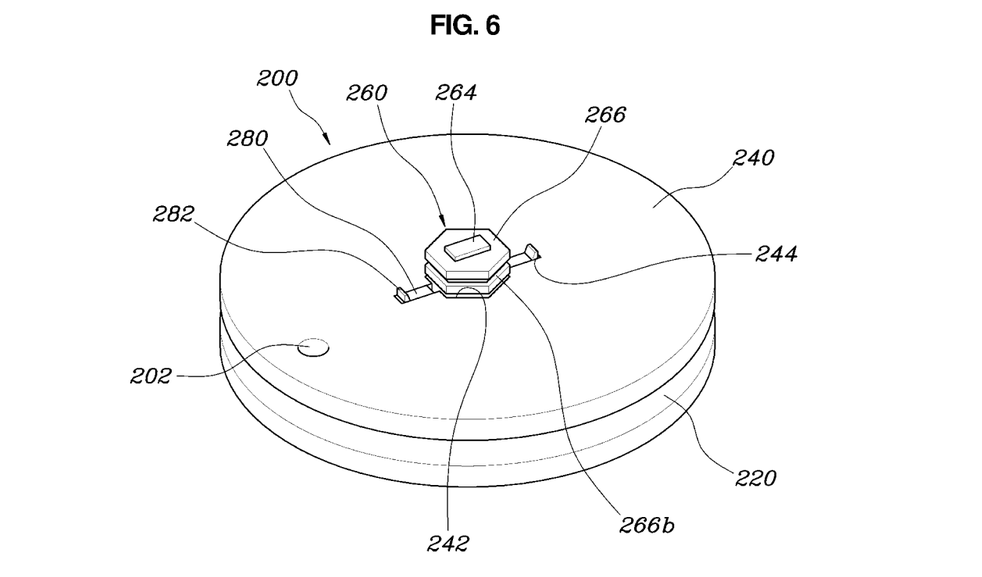

Regarding vertical movement of the resonant cover 200 due to rotation thereof, as shown in FIG. 6, the resonant cover 200 may include: a lower plate 220 formed in a shape of a plate so as to close the inner space of the housing 100; an upper plate 240 combined with the lower plate 220 and arranged by being spaced apart upward from the lower plate 220 at a predetermined distance, the upper plate 240 having a through hole 242 formed through a center thereof; and a height adjustment device 290 including: a bolt unit 260 rotatably combined with the lower plate 220 and exposed outside an upper surface of the upper plate 240 through the through hole of the upper plate 240; and a slider part 280 provided to be movable toward the bolt unit 260 from the through hole of the upper plate 240, so that the height adjustment device allows the upper plate 240 and the lower plate 220 to rotate together during rotation of the bolt unit 260 while the slider part 280 comes into contact with the bolt unit 260.

The resonant cover 200 may include: the lower plate 220; the upper plate 240; the bolt unit 260; and the slider part 280. The bolt unit 260 is rotatably combined with the lower plate 220, and is exposed outside the upper surface of the upper plate 240 through the through hole 242 of the upper plate 240. Here, each of the upper plate 240 and the lower plate 220 includes the resonance hole 202 formed therethrough, and thus the inner space of the housing 100 and the inside of the tire communicate with each other so as to realize noise reduction via air flow through the resonance hole. Further, the upper plate 240 is provided with the slider part 280, and when the slider part 280 fails to come into contact with the bolt unit 260, the bolt unit 260 rotates idly on the lower plate 220, and thus although the bolt unit 260 rotates, the bolt unit 260 does not interrupt the upper plate 240 and the lower plate 220. However, when the slider part 280 moves toward the bolt unit 260 and comes into contact with the bolt unit 260, the slider part 280 rotates with the upper plate 240 and the lower plate 220 during rotation of the bolt unit 260. Accordingly, the resonant cover 200 moves upward and downward while being in contact with the guide threads 140 in the inner space of the housing 100.

Figure 7:
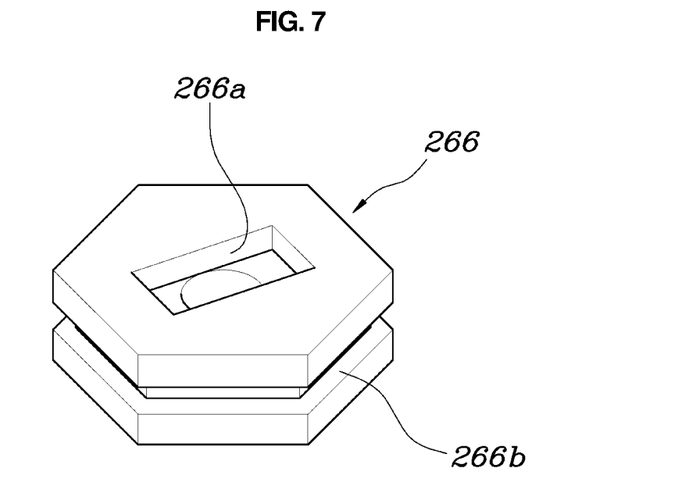
Figure 8:
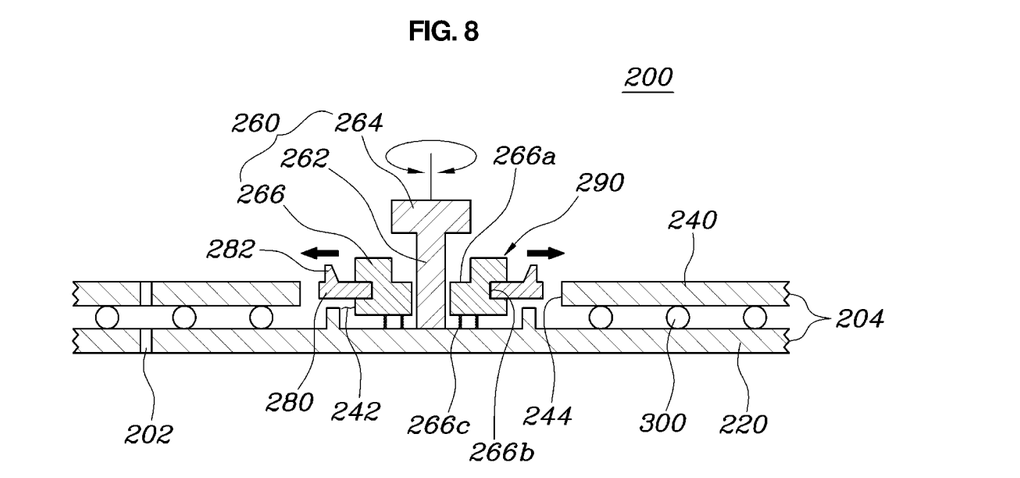
Figure 9:
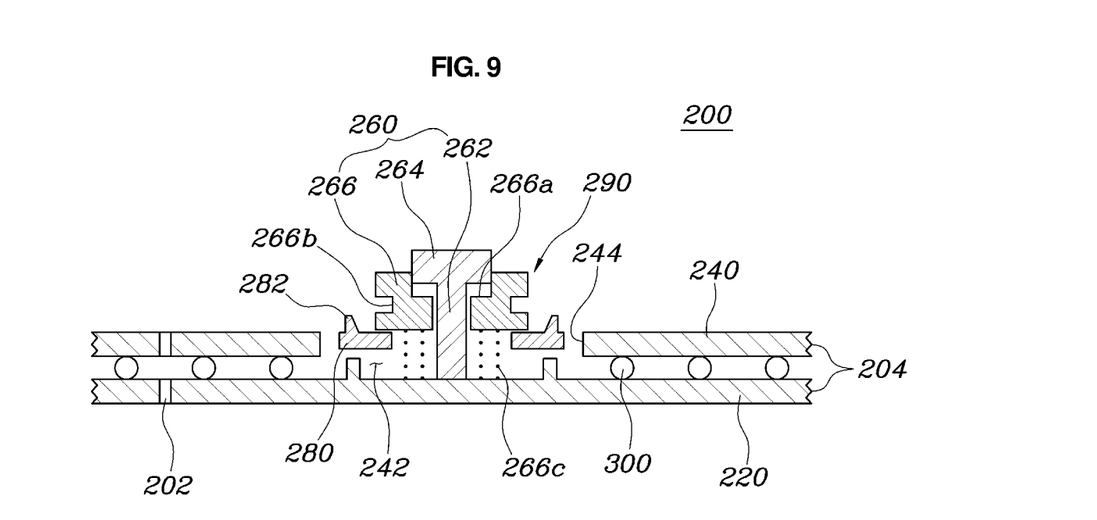

Specifically, the bolt unit 260 of the height adjustment device 290 includes: a body part 262 being rotatably and vertically provided on a center of the lower plate 220; a head part 264 formed polygonally on an upper end of the body part 262; and a position-holding part 266 slidably fitted over the body part to move along the body part 262 upward and downward, with a depressed coupling seat 266A formed on an upper end of the position-holding part to surround the head part 264. As shown in FIGS. 6 to 8, since the bolt unit 260 includes: the body part 262; and the head part 264 protruding from the upper end of the body part 262 in directions toward an outer circumferential surface thereof, the bolt unit 260 has a T-shaped cross section. The position-holding part 266 is fitted over the body part 262 formed by extending vertically such that the position-holding part can slide along a longitudinal direction of the body part The position-holding part 266 is configured in such a manner that when the position-holding part 266 is positioned at an upper part or a lower part of the body part 262, the position-holding part is combined with the head part 264 or with the slider part 280.

That is, the position-holding part 266 includes the depressed coupling seat 266A formed on the upper end thereof by being depressed to surround the head part 264. Accordingly, when the position-holding part 266 moves upward and is combined with the head part 264, the depressed coupling seat 266A is combined with the head part 264 to surround the head part 264, and thus during rotation of the position-holding part 266, the head part 264 and the body part 262 are rotated together. In addition, the position-holding part 266 has a slit 266B formed on a periphery thereof, wherein the slit 266B is formed to have a polygonal surface along the periphery such that the upper plate 240 and the lower plate 220 rotate with the bolt unit 260 when the slider part 280 is inserted into the slit of the position-holding part 266. Further, the position-holding part 266 is elastically supported by an elastic spring 266C on the lower plate 220.

The position-holding part 266 is moved to the upper part or the lower part of the body part 262 so as to be combined with the head part 264 or the slider part 280, such that, as will be described hereinbelow, a vertical height adjustment of the resonant cover 200 and a sealing of the resonant cover 200 with the housing 100 are realized. The combination of the position-holding part 266 with the head part 264 or the slider part 280 will be described in detail hereinbelow.

As shown in FIG. 6, the upper plate 240 may be provided with a guide hole 244 formed therethrough by extending from a center of the through hole 242 in a diametrical direction, and the slider part 280 may be provided in the guide hole 244 and slide along the guide hole 244 toward the center of the through hole 242. Accordingly, the upper plate 240 may be provided with the guide hole 244 formed therethrough by extending from the center of the through hole 242 in the diametrical direction, and when the slider part provided in the guide hole 244 slides along the direction of the extended guide hole 244 toward the center of the through hole 242, the slider part 280 may be combined with the position-holding part 266.

Here, a vertical length of the position-holding part 266 and a length of the body part 262 may be set such that when the position-holding part 266 is positioned at the lower part of the body part 262, the slider part 280 comes into contact with the position-holding part 266, and when the position-holding part 266 is positioned at the upper part of the body part 262, the slider part 280 is positioned under the position-holding part 266. Accordingly, the position-holding part 266 and the body part 262 may be configured such that the slider part 280 comes into contact with the position-holding part 266, or does not come into contact therewith according to a position of the position-holding part 266.

It is preferred that the slider part 280 is configured so as to move toward the center of the through hole 242 by being elastically supported by an additional spring in the guide hole 244 of the upper plate 240. The slider part 280 may be provided with a grip part 282 formed on an upper end thereof by protruding upward, which allows an operator to easily manipulate a movement of the slider part 280.

Figure 10:
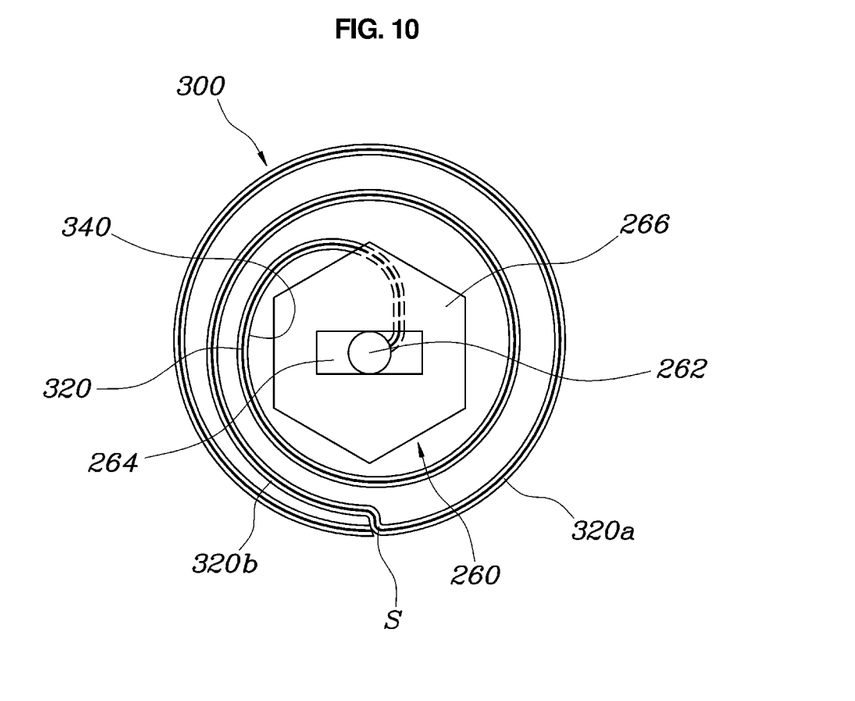

Meanwhile, as shown in FIGS. 8 and 10, the apparatus of the present invention may further include: a spiral spring 300 provided between the lower plate 220 and the upper plate 240, the spiral spring being formed of an elastic cord 320 that is wound forming continuous orbits, wherein the elastic cord 320 is connected to the bolt unit 260, and thus diameters of spiral spring orbits increase or decrease during the rotation of the bolt unit 260.

The spiral spring 300 is provided between the lower plate 220 and the upper plate 240, and the elastic cord 320 is connected to the body part 262 of the bolt unit 260 at a first end thereof, and is continuously unwound forming orbits so as to gradually increase the diameters of the spiral spring orbits such that an outermost side of the elastic cord comes into contact with the inner circumferential surface of the housing 100.

Specifically, the elastic cord 320 forming the spiral spring 300 is connected to the bolt unit 260 at a first end thereof, unwound so as to gradually increase the diameters of the spiral spring orbits, bent outward from an inner orbit 320B adjacent to an outermost orbit 320A in a diametrical direction, and rewound to form the outermost orbit, such that a second end of the elastic cord 320 is positioned at a starting point S of the outermost orbit 320A, whereby the spiral spring is placed inside the housing 100 such that the outermost side of the elastic cord 320 comes into close contact with the inner circumferential surface of the housing 100.

As shown in FIG. 10, the elastic cord 320 forming the spiral spring 300 is connected to the body part 262 of the bolt unit 260 at the first end thereof, bent outward from the inner orbit 320B adjacent to the outermost orbit 320A in the diametrical direction, and rewound to form the outermost orbit, such that the second end of the elastic cord 320 is positioned at the starting point S of the outermost orbit 320A. That is, the elastic cord 320 is bent from the inner orbit 320B adjacent to the outermost orbit 320A, and is rewound one round by using as a starting point S a position where the elastic cord is rewound, such that the second end of the elastic cord 320 is positioned at the starting point S of the outermost orbit 320A. Accordingly, as the outermost orbit 320A of the elastic cord 320 circles, the outermost orbit 320A comes into close contact with the inner circumferential surface of the housing 100.

Here, the spiral spring 300 may be wrapped with a sealing rubber 340 on a surface thereof such that when the outermost side of the elastic cord 320 comes into close contact with the inner circumferential surface of the housing 100, the inner space of the housing 100 is sealed by the sealing rubber 340.

Operation of the apparatus for noise reduction of a tire according to the present invention mentioned above will be described hereinbelow.

First, concerning the vertical height adjustment of the resonant cover 200, as shown in FIG. 8, the slider part 280 is pushed from the height adjustment device 290 provided in the resonant cover 200 in a direction receding from the center of the through hole 242 so as not to prevent the position-holding part 266 from moving. Next, when the position-holding part 266 is moved to the lower part of the body part 262, and the slider part 280 is moved toward the center of the through hole 242, the slider part 280 is inserted into the slit 266B of the position-holding part 266. Here, the slit 266B of the position-holding part 266 is formed to have the polygonal surface along the periphery of the position-holding part, and thus during rotation of the position-holding part 266, the slider part 280 is stuck in the slit, and rotates with the position-holding part 266, which also rotates the upper plate 240 and the lower plate 220. When the upper plate 240 and the lower plate 220 are rotated, the corresponding threads 204 formed on the outer circumferential surface of the resonant cover 200 move in contact with the guide threads 140 of the housing 100. The resonant cover 200 is moved to the upper part or the lower part of the inner space of the housing 100, and thus the inner space of the housing 100 changes in the volume. Accordingly, since the tuning of resonance frequency becomes possible, performance of noise reduction of a tire can be optimized according to a specification of the tire.

Meanwhile, concerning the sealing of the inner space of the housing 100, after completing the height adjustment of the resonant cover 200, the slider part 280 is pushed in the direction receding from the center of the through hole 242 such that the slider part 280 is removed from the slit 266B of the position-holding part 266. When the slider part 280 is removed from the slit 266B of the position-holding part 266, the position-holding part 266 supported elastically by the elastic spring 266C is moved upward by an elastic force such that the head part 264 is inserted into the depressed coupling seat 266A formed on the upper end of the position-holding part 266, and the slider part 280 is positioned under the position-holding part 266 so as to prevent the position-holding part 266 from moving downward.

Figure 11:
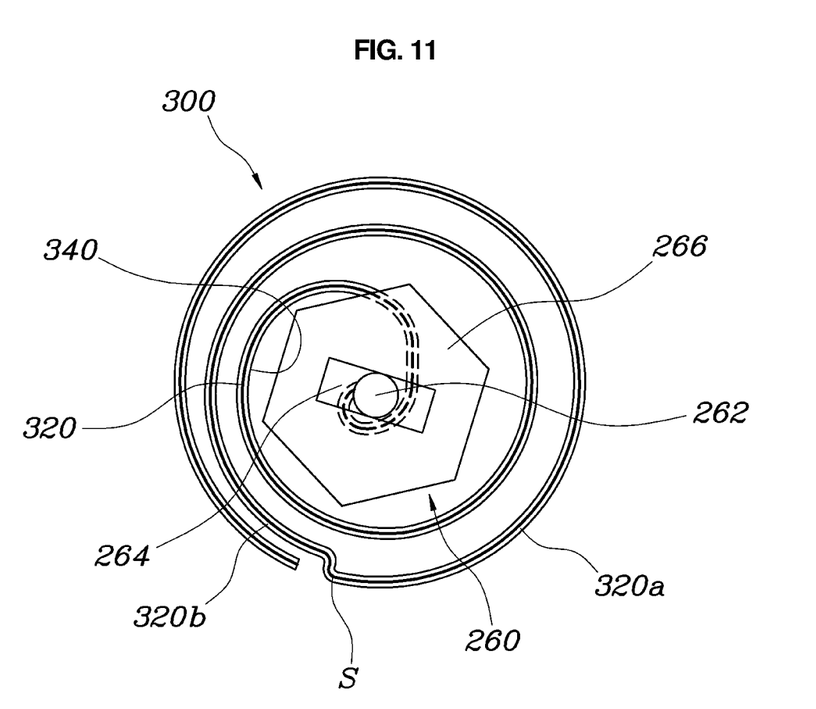

In particular, although the position-holding part 266 rotates with the head part 264 and the body part 262, the position-holding part 266 rotates idly independent of the upper plate 240 and the lower plate 220. When the position-holding part 266 rotates, positions of the upper plate 240 and the lower plate 220 are maintained, and the spiral spring 300 connected to the bolt unit 260 is wound, and thus the diameters of the orbits of the spiral spring 300 are changed. That is, as shown in FIGS. 10 and 11, the diameters of the orbits of the spiral spring 300 can be changed according to a rotational direction of the position-holding part 266. Accordingly, when the resonant cover 200 requires the vertical height adjustment, the diameters of the orbits of the spiral spring 300 are manipulated to be reduced, and when the inner space of the housing 100 requires sealing, the diameters of the orbits of the spiral spring 300 are manipulated to be increased.

In particular, since the elastic cord 320 forming the spiral spring 300 is wrapped with the sealing rubber 340 on the surface thereof, air escape is prevented when the elastic cord 320 comes into close contact with the inner circumferential surface of the housing 100.

The apparatus for noise reduction of a tire having the above-mentioned configuration reduces noise within a particular frequency range generated in the tire during operation of a vehicle. In particular, since the resonant cover 200 provided in the housing 100 can perform the vertical height adjustment thereof, the resonant cover 200 can vertically move in the inner space of the housing 100, thereby enabling tuning of resonance frequency via volume change of the inner space.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An apparatus for noise reduction of a tire, the apparatus comprising:
    a housing mounted on an outer circumferential surface of a wheel rim, the tire being fitted over the wheel rim, and the housing having an inner space and formed so as to be open at an upper part of the housing;
    a resonant cover provided in the inner space of the housing and configured to close the upper part of the housing; and
    a resonance hole formed in the resonant cover to allow the inner space of the housing and an inside of the tire to communicate with each other so that the resonant cover controls pulsation via air entering and exiting through the resonance hole,
    wherein the housing has guide threads formed on an inner circumferential surface of the housing, and the resonant cover has corresponding threads formed on an outer circumferential surface of the resonant cover so as to correspond to the guide threads, and
    wherein the resonant cover comprises:
        a lower plate formed in a shape of a plate so as to close the inner space of the housing;
        an upper plate combined with the lower plate and arranged by being spaced apart upward from the lower plate at a predetermined distance, the upper plate having a through hole formed through a center of the upper plate; and
        a height adjustment device including: a bolt unit rotatably combined with the lower plate and exposed outside an upper surface of the upper plate through the through hole of the upper plate; and a slider part provided to be movable toward the bolt unit from the through hole of the upper plate, so that the height adjustment device allows the upper plate and the lower plate to rotate together during rotation of the bolt unit while the slider part comes into contact with the bolt unit.

2. The apparatus of claim 1, wherein the wheel rim is provided with at least one mount part on the outer circumferential surface of the wheel rim, and the housing is arranged on the mount part, the housing including an engagement part formed beneath a lower end of the housing with which the mount part is engaged.

3. The apparatus of claim 2, wherein the mount part of the wheel rim is formed into a male screw or a female screw, and the engagement part of the housing is formed into a female screw or a male screw corresponding to the mount part.

4. The apparatus of claim 1, wherein the bolt unit of the height adjustment device comprises: a body part being rotatably and vertically provided on a center of the lower plate; a head part formed polygonally on an upper end of the body part; and a position-holding part slidably fitted over the body part to move along the body part upward and downward, with a depressed coupling seat formed on an upper end of the position-holding part to surround the head part.

5. The apparatus of claim 4, wherein the position-holding part has a slit formed on a periphery of the position-holding part, wherein the slit is formed to have a polygonal surface along the periphery such that the upper plate and the lower plate rotate with the bolt unit when the slider part is inserted into the slit of the position-holding part.

6. The apparatus of claim 4, wherein the position-holding part is elastically supported by an elastic spring on the lower plate.

7. The apparatus of claim 1, wherein the upper plate is provided with a guide hole formed therethrough by extending from a center of the through hole in a diametrical direction, and
    the slider part is provided in the guide hole and slides along the guide hole toward the center of the through hole.

8. The apparatus of claim 1, wherein the slider part is provided with a grip part formed on an upper end of the slider part by protruding upward.

9. The apparatus of claim 1, further comprising: a spiral spring provided between the lower plate and the upper plate, the spiral spring being formed of an elastic cord that is wound forming continuous orbits, wherein the elastic cord is connected to the bolt unit, and thus diameters of spiral spring orbits increase or decrease during the rotation of the bolt unit.

10. The apparatus of claim 9, wherein the elastic cord forming the spiral spring is connected to the bolt unit at a first end of the elastic cord, unwound so as to gradually increase the diameters of the spiral spring orbits, bent outward from an inner orbit adjacent to an outermost orbit in a diametrical direction, and rewound to form the outermost orbit, such that a second end of the elastic cord is positioned at a starting point of the outermost orbit, whereby the spiral spring is placed inside the housing such that an outermost side of the elastic cord comes into close contact with the inner circumferential surface of the housing.

11. The apparatus of claim 9, wherein the spiral spring is wrapped with a sealing rubber on a surface of the spiral spring.

12. The apparatus of claim 1, wherein each of the upper plate and the lower plate includes the resonance hole formed therethrough, and the inner space of the housing and the inside of the tire communicate with each other.

* * * * *